United States Patent Office 3,413,352
Patented Nov. 26, 1968

3,413,352
PREPARATION OF SUBSTITUTED ALDEHYDES
AND KETONES FROM VINYL ESTERS
Richard F. Heck, Wilmington, Del., assignor to Hercules Incorporated, a corporation of Delaware
No Drawing. Filed Aug. 13, 1965, Ser. No. 479,649
11 Claims. (Cl. 260—590)

ABSTRACT OF THE DISCLOSURE

A carbonyl compound of the formula

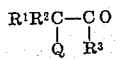

is produced by contacting in the liquid state at a temperature in the range of 0° C. to 150° C. until reaction is complete, an organometallic compound of a metal of Group VIII with water and a vinyl alcohol ester of a formula of the group consisting of

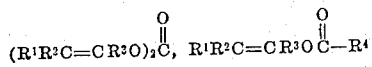

and

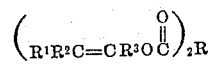

in which $R^1$, $R^2$ and $R^3$ are members of the group consisting of hydrogen and hydrocarbon groups having neither ethylenic nor acetylenic unsaturation and the total carbon of said hydrocarbon groups is less than 15, and the ester group represented by

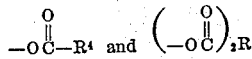

is a carboxylic ester group in which formulas $R^4$ is a monovalent hydrocarbon group having less than 18 carbon atoms and no ethylenic or acetylenic unsaturation, and R is a divalent hydrocarbon radical having 2 to 6 carbon atoms and no ethylenic or acetylenic unsaturation, and X is an anion of the group consisting of halides, nitrates, chlorates, perchlorates, sulfates, acylates and acetylacetonates, and Q is the organo group of said organometallic compound and is a carbon bonded organo group selected frm the group consisting of aryl radicals and hydroxy-, chloro-, methoxy-, nitro-, phenyl-, and diethylamino-substituted aryl radicals where the aryl radical is a member of the group consisting of phenyl, naphthyl, anthracenyl, phenanthryl, fluorenyl, and furyl, thienyl, and benzothienyl.

---

This invention relates to the production of carbonyl compounds of the class of aldehydes and ketones from esters of vinyl alcohols.

In accordance with the present invention, it has been found that by reacting an organometallic compound of a metal of Group VIII of the Periodic Chart and an organic residue with water and a vinyl alcohol ester of one of the formulas:

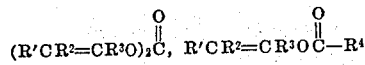

or

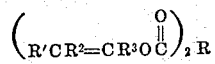

wherein R is a divalent hydrocarbon group, R', $R^2$ and $R_3$ are hydrogen or monovalent hydrocarbon groups, and $R_4$ is a monovalent hydrocarbon group, there is produced a substituted carbonyl compound of the formula

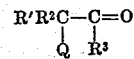

in which Q is the organic residue of the organometallic compound.

The organometallic compound of the metal of Group VIII of the Periodic Chart of the Elements (chart published by Fischer Scientific Company, a copy of which appears in Handbook of Chemistry and Physics, 33rd edition, pages 342–343 (1951)) is an organometallic compound whose structure is expressed by the formula QM'X or QM'$X_2$, depending on the valence of the Group VIII metal, M'. Q is an organic group referred to as an organic residue, and X is an anion.

The organometallic compound QM'X or QM'$X_2$ is prepared by reaction of a salt of the Group VIII metal with an organometallic compound of a metal of Groups I–A, II–A, II–B, III–A, or IV–A of the periodic chart and an organic residue, Q. This reaction may be expressed as follows:

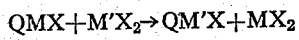

for the case where M and M' both have a valence of II and M is a Group II metal. Although $Q_2M$, $Q_3M$, $Q_4M$, $Q_2MX$, and $Q_3MX$ can be similarly used, the formula QMX will be used for illustration purposes, it being understood that M may be any of the metals of the above designated groups and that the actual formula will depend on the metal used and its valence.

In the preparation of the organometallic compound QM'X, there may be used such organometallic compounds as QNa, QLi, QK, $Q_2Cr$, QMgX, QCaX, QBaX, $Q_2Mg$, $Q_2Zn$, $Q_2Cd$, $Q_2Hg$, QZnX, QSn$X_3$, $Q_2SnX_2$, QCdX, QHgX, $Q_3Al$, $Q_2AlX$, QAl$X_2$, QTl$X_2$, $Q_4Sn$, $Q_4Pb$, and the like. The organometallic compounds of Groups I–A, II–A, III–A and zinc are stable to heat but so highly reactive with water and air that they must be used with special precautions. On the other hand, the organometallic compound of the Group VIII metal is relatively unreactive to water but unstable to heat. The reaction to produce QM'X from a reactive QMX is thus carried out in an inert atmosphere, an inert solvent and at a low temperature, preferably well below 0° C., e.g., at −20 to −80° C.

The organic residue Q can be any cyclic organic residue which forms an organometallic compound with a Group I–A, II–A, II–B, III–A or IV–A metal. Examples of such groups are aryl such as phenyl, naphthyl, anthracenyl, phenanthryl, fluorenyl, and substituted aryl, and heterocyclic groups such as furyl, thienyl, benzothienyl and substitution products thereof. After completion of the reaction, water may be added to destroy any of the QMX compound which may remain and the whole reaction mixture of QM'X and M$X_2$ is suitable for use in this invention.

In the case of Tl and particularly of Hg and the Group IV–A metals, water and air may be tolerated in the preparation of the organometallic compound QM'X of the Group VIII metal. In these cases, the QM'X organometallic compound may be prepared either as a separate step, as in the case where the water reactive organometallic compounds are used as reagents, or the QM'X organometallic compound can be prepared in situ in the presence of the vinyl alcohol ester with which the QM'X is to react.

The vinyl alcohol esters to which this invention is applicable are exemplified by vinyl acetate, isopropenyl acetate, propenyl acetate, 2,2-dimethylvinyl acetate, trimethylvinyl acetate, 1-phenylvinyl acetate, 2-phenylvinyl acetate, vinyl propionate and propenyl benzoate. R', R², and R³ of the general formula may be any of the saturated alkyl, aryl, aralkyl and cycloalkyl radicals. The yields are better in the case of the less substituted vinyl groups of these esters than in the case of the more highly substituted vinyl groups or vinyl groups substituted by high molecular weight hydrocarbon groups. In general, the reaction works best when the total number of carbons in R', R² and R³ is less than 15.

The vinyl alcohol ester which is useful in the process of this invention and is represented by the above general formula includes the acylates and arylates of the vinyl alcohol such as the acetate, propionate, butyrate, stearate, benzoate, toluate, nitrobenzoate, trifluoroacetate, trichloroacetate, monochloroacetate, chlorobenzoate, phenylacetate and p-toluenesulfonate. There may also be used dibasic acid esters such as the oxalate, succinate, carbonate, and phthalate. The most useful esters are those which are most readily available and in this category the acetate is preferred because of its ease of preparation. Since the ester group is eliminated in the process of this invention, it has little influence on the type of product obtained.

The process of this invention is carried out by mixing the organometallic compound of the metal of Group VIII of the Periodic Chart, water, and the ester of the vinyl alcohol at a temperature in the range of 0 to 100° C. until the reaction is complete. In those cases referred to above where the organometallic compound of the metal of Group VIII is prepared in situ, the organometallic compound of the metal of Group II–B or Group IV–A, a salt of the Group VIII metal, water, and the ester of the vinyl alcohol are mixed together and reacted at a temperature in the range of 0 to 150° C.

The organometallic compound which is used as a reagent for the production of the Group VIII organometallic compound has been shown in the examples as having been prepared separately. However, the organometallic compounds may in many cases be prepared right in the reaction mixture by adding the necessary reagents therefor. This is particularly the case of many organomercury compounds. For example anisole reacts directly with mercuric acetate or chloride to form a methoxyphenylmercury chloride or acetate and in the place of this organometallic compound, there may be used as reagents anisole and mercuric acetate or mercuric chloride. A mixture of anisole, mercuric acetate, palladium diacetate, and vinyl acetate will thus give as a product p-methoxyacetaldehyde. Other mercuriatable organic compounds which may similarly be used are thiophene, phenol, diethylaniline, o-nitroanisole, p-chlorophenol, 1,3-dimethoxybenzene and m-chlorodiethylaniline.

When the organomercury compound requires special conditions for its preparation, the organomercury compound may be prepared separately.

In the process of this invention, the Group VIII metal organometallic compound is converted to a reduced metal hydride, salt or even the free metal in the process in the absence of reoxidizing materials. In the case of the more expensive of the Group VIII metals, it is highly desirable to recover the metal for reuse. This can be accomplished chemically with or without electrical energy, either in the reaction system or outside the reaction system. In the case where the organometallic compound of the Group VIII metal is formed from one of the organometallic compounds of a Group I–A, II–A, or III–A metal, it is preferable to separate the Group VIII metal and regenerate the salt for reuse thereof outside the system. In the case where the Group II–B or IV–A organometallic compound is used for producing the organometallic compound of the Group VIII metal in situ, it is preferable to regenerate the Group VIII metal for reuse without purification. This can be accomplished in the reaction system or outside the reaction system. When accomplished within the reaction system, is possible to use the Group VIII metals in much lower amounts than otherwise. In many of the examples which follow, regeneration of the palladium used is accomplished by the action of $CuCl_2$. In actual practice, a usual redox system using air may also be used. For instance, if air is added to the system containing $CuCl_2$, the $CuCl_2$ which is reduced will be reoxidized and the $CuCl_2$ formed by reoxidation will in turn oxidize the Pd° or $PdHCl_2$ formed in the process back to $PdCl_2$ or a complex salt thereof which can then form the organopalladium compound. Such an overall process reuses the metals so that catalytic amounts may be used for continuing the process. The overall process may then be represented as follows using palladium and mercury as the preferred metals of the process:

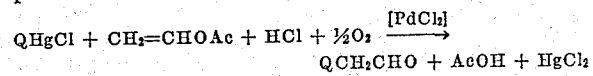

$$QHgCl + CH_2=CHOAc + HCl + \tfrac{1}{2}O_2 \xrightarrow{[PdCl_2]} QCH_2CHO + AcOH + HgCl_2$$

Redox systems that can be used are those that contain compounds of metals which, under various reaction conditions, may appear in more than one oxidation stage, for example, compounds of copper, mercury, cerium, iron, thallium, vanadium, and the like. Copper is preferred. The compounds of these metals are organic or inorganic salts, e.g., nitrates, sulfonates, chlorides or acetates. The reaction medium is slightly acid and acid may be added to maintain acidity. Moreover, salts of lithium, calcium, sodium, barium, magnesium and the like may be added to improve solubility relationships.

When a redox system is used, the Group VIII metal may be introduced as metal, suitably finely divided or as a salt such as acetate or chloride. This is particularly suitable when palladium is used.

Anions which may be used in the reaction mixture, besides the chloride and acetate, are other halogens, nitrates, chlorates, perchlorates, and sulfates, acylates and acetylacetonates.

The process of this invention is illustrated by the following examples.

Example 1

To a mixture of

| | Grams |
|---|---|
| Phenylmercuric chloride (10 mmoles) | 3.13 |
| Cupric chloride (10 mmoles) | 1.35 |
| Lithium chloride (10 mmoles) | 0.42 |
| Acetic acid | 8 |
| Water | 1 |
| Vinyl acetate | 0.9 | was added 1.0 ml. 0.1 molar $Li_2PdCl_4$ in acetic acid at 24° C. and the mixture was stirred at 24° C. for 24 hours. A sample of this product was analyzed by gas chromatography. The yield of phenylacetaldehyde was 30% of theoretical.

Example 2

To a mixture of

| | Grams |
|---|---|
| Phenylmercuric chloride (10 mmoles) | 3.13 |
| Cupric chloride (10 mmoles) | 1.35 |
| Lithium chloride (10 mmoles) | 0.42 |
| Acetic acid | 7 |
| Water | 1 |
| Isopropenyl acetate | 0.9 | was added 1.0 ml. 0.1 molar $Li_2PdCl_4$ in acetic acid at 24° C. and the mixture was stirred at 24° C. for 24 hours. A sample of the product was analyzed by gas chromatography. The yield of phenyl acetone was 50% of theoretical.

Example 3

To a mixture of

| | Grams |
|---|---|
| Naphthylmercuric chloride (10 mmoles) | 3.63 |
| Cupric chloride (10 mmoles) | 1.35 |

| | |
|---|---|
| Lithium chloride (10 mmoles) | 0.42 |
| Acetic acid | 7 |
| Water | 1 |
| Vinyl acetate | 0.9 | was added 1.0 ml. 0.1 molar Li$_2$PdCl$_4$ in acetic acid, at 24° C. and the mixture was stirred at 24° C. for 24 hours. A sample of the product was analyzed by gas chromatography. The yield of naphthyl acetaldehyde was 10% of theoretical.

Example 4

To a mixture of

| | Grams |
|---|---|
| Phenyl mercuric chloride (10 mmoles) | 3.13 |
| Cupric chloride (10 mmoles) | 1.35 |
| Lithium chloride (10 mmoles) | 0.42 |
| Acetic acid | 7 |
| Water | 1 |
| Propenyl acetate | 0.9 | was added 1.0 ml. 0.1 molar Li$_2$PdCl$_4$ in acetic acid, at 24° C. and the mixture was stirred at 24° C. for 24 hours. A sample of the product was analyzed by gas chromatography. The yield of hydratropaldehyde was 40% of theoretical.

Example 5

To a mixture of

| | Grams |
|---|---|
| 2-naphthyl mercuric chloride (10 mmoles) | 3.63 |
| Cupric chloride (10 mmoles) | 1.34 |
| Lithium chloride (10 mmoles) | 0.42 |
| Acetic acid | 7 |
| Water | 1 |
| Isopropenyl acetate | 0.9 | was added 1.0 ml. 0.1 molar Li$_2$PdCl$_4$ in acetic acid at 24° C. and the mixture was stirred at 24° C. for 24 hours. A sample of the product was analyzed by gas chromatography. The yield of 2-naphthylacetone was 20% of theoretical.

Example 6

To a mixture of

| | Grams |
|---|---|
| Phenyl mercuric acetate (20 mmoles) | 6.26 |
| Cupric chloride (20 mmoles) | 2.70 |
| Lithium chloride (20 mmoles) | 0.84 |
| Acetic acid | 7 |
| Water | 1 |
| Isopropenyl acetate | 1.8 | was added 1.0 ml. 0.1 molar Li$_2$PdCl$_4$ in acetic acid at 24° C. and the mixture was stirred at 24° C. for 24 hours. A sample of the product was analyzed by gas chromatography. The yield of phenyl-acetone was 15% of theoretical.

Example 7

To a mixture of

| | Grams |
|---|---|
| Phenyl mercuric acetate (10 mmoles) | 3.37 |
| Cupric chloride (20 mmoles) | 2.68 |
| Lithium chloride (20 mmoles) | 0.82 |
| Acetic acid | 7 |
| Water | 1 |
| Isopropenyl acetate | 0.9 | was added 1.0 ml. 0.1 molar Li$_2$PdCl$_4$ in acetic acid at 24° C. and the mixture was stirred at 24° C. for 24 hours. A sample of the product was analyzed by gas chromatography. The yield of phenyl-acetone was 25% of theoretical.

Example 8

To a mixture of

| | Grams |
|---|---|
| Phenyl mercuric chloride (10 mmoles) | 3.13 |
| Cupric chloride (10 mmoles) | 1.34 |
| Lithium chloride (10 mmoles) | 0.42 |
| Acetic acid | 8 |
| Water | Trace |
| 2,2-dimethylvinyl acetate | 0.9 | was added 1.0 ml. 0.1 molar Li$_2$PdCl$_4$ in acetic acid at 24° C. and the mixture was stirred at 24° C. for 24 hours. A sample of the product was analyzed by gas chromatography. The yield of 2,2-dimethyl-2-phenylacetaldehyde was 15% of theoretical.

Example 9

A mixture of 0.31 gram phenylcercuric chloride, 10 ml. 0.1 molar Li$_2$PdCl$_4$ in acetic acid, 1 gram water, and 0.9 gram isopropenyl acetate were mixed and stirred at 24° C. for 72 hours, and 60° C. for 2 hours. At the end of this period, a sample was analyzed by gas chromatography. The yield was 60% of theory of phenyl acetone.

Example 10

A mixture of 0.31 grams phenylmercuric chloride, 10 ml. 0.1 molar Li$_2$PdCl$_4$ in methanol, 1 gram water, and 0.9 gram isopropenyl acetate were mixed and stirred at 24° C. for 72 hours and 60° C. for 2 hours. At the end of this period, a sample was analyzed by gas chromatography. The yield was 100% of theory of phenyl acetone.

Example 11

A mixture of 0.31 gram phenylmercuric chloride, 10 ml. 0.1 molar LiPdCl$_3$ in acetonitrile, 1 gram water, and 1 gram isopropenyl acetate were mixed and stirred at 24° C. for 72 hours. At the end of this period, a sample was analyzed by gas chromatography. The yield was 20% of theory of phenyl acetone.

Example 12

A mixture of

| | Grams |
|---|---|
| Tetraphenyltin (2.5 mmoles) | 1.1 |
| Cupric chloride (20 mmoles) | 2.68 |
| Lithium chloride (20 mmoles) | 0.82 |
| Acetic acid | 7 |
| Water | 1 |
| Isopropenyl acetate | 0.9 | was stirred with 1 ml. 0.1 molar Li$_2$PdCl$_4$ in acetic acid for 72 hours at 24° C. A sample of the mixture was analyzed by gas chromatography. The yield of phenyl acetone was 6% of theory.

Example 13

A mixture of

| | Grams |
|---|---|
| Tetraphenyllead (2.5 mmoles) | 1.3 |
| Cupric chloride (20 mmoles) | 2.68 |
| Lithium chloride (20 mmoles) | 0.82 |
| Acetic acid | 7 |
| Water | 1 |
| Isopropenyl acetate | 0.9 | was stirred with 1 ml. 0.1 molar Li$_2$PdCl$_4$ in acetic acid for 72 hours at 24° C. A sample of the mixture was analyzed by gas chromatography. The yield of phenyl acetone was 10% of theory.

Example 14

A mixture of 3.14 grams (10 mmoles) phenylmercuric chloride, 5 grams water and 1.0 gram 1-acetoxystyrene were stirred with 100 ml. 0.1 molar Li$_2$PdCl$_4$ in methanol for 72 hours at 24° C. A sample of the product was analyzed by gas chromatography. The yield of benzyl phenyl ketone was 25% of theory.

Example 15

A mixture of 10 mmoles p-chloromercuricbenzoic acid, 2 mls. isopropenyl acetate, 5 mls. water and 100 mls. 0.1 M Li$_2$PdCl$_4$ in acetic acid was stirred at room temperature for three days. The reaction mixture was diluted with water and methylene chloride and filtered to remove the palladium metal formed. The methylene chloride layer was separated and the aqueous solution was extracted 3 more times with methylene chloride. The extracts were combined, washed with water, dried with anhydrous magnesium sulfate and evaporated. The residue remaining after evaporating the solvent was dissolved in boiling aqueous methanol, filtered from a little palladium metal still present, and cooled. The product separated as colorless crystals. The product was filtered and recrystallized from benzene-hexane. There was obtained 0.065 g. (3.7%) of colorless p-carboxybenzyl methyl ketone, M.P. 196.5–197.0° C.

*Analysis.*—Found: C, 67.25%; H, 5.94 %.

Example 16

A reaction mixture containing 10 mmoles PdCl$_2$, 20 mmoles of lithium chloride, 10 mmoles of phenylmercuric chloride, 1.0 ml. isopropenyl acetate, 7 mls. methanol and 1 ml. of water was stirred at room temperature for two days. Gas chromatographic analysis then showed the reaction mixture to be 0.421 M in benzyl methyl ketone (38%). There was also a little diphenyl present.

Example 17

A reaction mixture containing 50 mmoles of phenylmercuric chloride, 50 mmoles lithium chloride, 50 mmoles cupric chloride, 37 mls. acetic acid, 2.5 mls. water, 5 mls. vinyl acetate and 5 mls Li$_2$PdCl$_4$ in acetic acid was stirred at room temperature for 2 hours. Three such reaction mixtures were combined and diluted with water and methylene chloride. After filtering, the methylene chloride layer was separated and the aqueous layer was extracted three more times with methylene chloride. The combined methylene chloride solutions were washed with water, dried over anhydrous magnesium sulfate and distilled under reduced pressure. There was obtained 5.2 g. of colorless liquid phenylacetaldehyde, B.P. 71–80° C. (7 mm.), which was 87% pure by gas chromatography (about a 25% yield). A portion of the product was converted into a 2,4-dinitrophenylhydrazone, M.P. 116–116.5° C. after several recrystallizations from ethanol.

*Analysis.*—Found: C, 56.25%; H, 4.20%; N, 18.72%.

Example 18

A reaction mixture containing 10 mmoles phenylmercuric chloride, 1 ml. acetophenone enol acetate, 5 ml. of water and 100 mls. of 0.1 M Li$_2$PdCl$_4$ in methanol was stirred at room temperature for 3 days. The reaction mixture was then filtered to remove palladium metal and evaporated in vacuum. The residue was extracted with hot hexane. On cooling, the hexane solution deposited crystals of benzyl methyl ketone. The product was further purified by vacuum distillation and the two recrystallizations from aqueous methanol. There was obtained 0.125 g. of product (6.4%), M.P. 55.5–56.0° C.

*Analysis.*—Found: C, 85.82%; H, 6.49%.

Example 19

A reaction mixture containing 8.8 mmoles of m-chloromercurinitrobenzene, 1.1 ml. acetophenone enol acetate, 5 mls. water and 100 mls. 0.1 M Li$_2$PdCl$_4$ in methanol was stirred at room temperature overnight. The solution was then filtered and concentrated by evaporating the solvent. The product was extracted from the residue with hot hexane. After cooling, the hexane solution deposited sticky crystals of 3-nitrobenzyl phenyl ketone. Two further crystallizations from aqueous methanol gave 0.200 g. of nearly colorless needles, M.P. 79.5–80.5° C. (9.4%).

*Analysis.*—Found: C, 69.64%; H, 5.02%; N, 5.60%.

The ultraviolet spectrum of the product in ethanol solution had an absorption maximum at 247 m$\mu$ with $\epsilon$=18,800.

Example 20

A reaction mixture containing 10 mmoles 4-phenylphenylmercuric chloride, 1 ml. propenyl acetate, 5 ml. water and 100 ml. 0.1 M Li$_2$PdCl$_4$ in methanol was stirred at room temperature for 3 days. The reaction mixture was then filtered and the solvent evaporated under reduced pressure. The product was extracted from the residue with boiling hexane. On cooling, the hexane solution gave a solid 2-(4-phenyl)phenylpropionaldehyde which was separated and reacted with a solution of 2,4-dinitrophenylhydrazine in sulfuric acid-ethanol solution. The yellow derivative which formed was filtered and recrystallized twice from chloroformmethanol. There was obtained 0.042 g. of yellow-orange product (~1%) of M.P. 191–192° C.

*Analysis.*—Found: C, 64.39%; H, 4.81%; N, 13.80%.

Example 21

A reaction mixture containing 1.5 g. (4 mmoles) 4-chloromercuri-1,2-dichlorobenzene, 0.54 g. of p-methoxyacetophenone enol acetate (M.P. 68–70° C.), 50 mls. 0.1 M Li$_2$PdCl$_4$ in methanol and 2 mls. water was stirred at room temperature overnight. The reaction mixture was then filtered and concentrated under reduced pressure. The product was extracted from the residue with boiling hexane. After concentrating and cooling, crystals of 3,4-dichlorobenzyl p-anisyl ketone were obtained. These were recrystallized using charcoal to decolorize the hexane solution, to give 0.13 g. of crude product (11%), M.P. 101–103° C. Further recrystallization from hexane and twice from aqueous methanol gave colorless needles, M.P. 113.0–113.2° C.

*Analysis.*—Found: C, 60.9%; H, 4.59%.

Example 22

A reaction mixture containing 50 mmoles of phenylmercuric chloride, 50 mmoles cupric chloride, 50 mmoles lithium chloride, 5 ml. propenyl acetate, 35 ml. acetic acid, 5 ml. water and 5 mls. 0.1 M Li$_2$PdCl$_4$ in acetic acid was stirred at room temperature overnight. Four such reaction mixtures were combined and the product was isolated. There was obtained 5.1 g. of colorless product, B.P. 60–70° C. (4 mm.). A second fraction of 8 g., B.P. 120–160° C. (4 mm.) was also obtained. Gas chromatographic analysis showed the first fraction was 95% pure 2-phenylpropionaldehyde (18% yield) and the second contained about 50% of the first product. Redistillation of the second fraction gave 0.3 g. of the first product and material of B.P. 70–150° C. (6 mm.). This fraction solidified. After 4 crystallizations from aqueous methanol, there was obtained 0.6260 g. of shiny, colorless plates, M.P. 88.5–89.0° C., which proved to be 1,2-diphenyl-1-propene.

*Analysis.*—Found: C, 92.42%; H, 7.42%.

The N.M.R. spectrum in deuterochloroform at 60 mc. had bands at −134 c.p.s. (2 singlets of relative area 3 from the methyl group), at −404 c.p.s. (narrow doublet of relative area 1 from the vinyl hydrogen) and at −435 c.p.s. (multiplet of relative area 10 from the aromatic protons) with respect to tetramethylsilane as an internal standard.

Redistillation of the lower boiling fraction gave a purer sample of 2-phenylpropionaldehyde. The N.M.R. spectrum in deuterochloroform at 60 mc. had bands at −81 c.p.s. (doublet with $J$=7, relative area 3 from the methyl group), −209 c.p.s. (8 lines with relative area 1 from the tertiary hydrogen), at −430 c.p.s. (a multiplet of relative area 5 from the aromatic protons) and at −572 c.p.s. (doublet, $J$=1½, with relative area 1 from the aldehyde proton) with respect to tetramethylsilane as an internal standard.

*Analysis.*—Found: C, 79.5%; H, 7.8%.

Example 23

A reaction was carried out exactly as in the 2-phenylpropionaldehyde preparation in Example 22 but using isobutyraldehyde enol acetate instead of propenyl acetate. Four similar reaction mixtures were combined and isolated as in the 2-phenylpropionaldehyde preparation. There was obtained 3 g. of product, B.P. 77–100° C. (4 mm.), which was 50% 2-phenyl-2-methylpropionaldehyde by gas chromatography (7% yield). Biphenyl was a major by-product of the reaction. A pure sample of the aldehyde was obtained by preparative gas chromatography. The N.M.R. spectrum of pure material at 60 mc. in deuterochloroform solution had bands at −81 c.p.s. (singlet of relative area 6 from the methyl groups), at −428 c.p.s. (narrow multiplet of relative area 5 from the aromatic protons), and at −558 c.p.s. (singlet of relative area 1 from the aldehyde proton) with respect to tetramethylsilane as an internal standard.

*Analysis.*—Found: C, 79.7%; H, 8.8%.

What I claim and desire to protect by Letters Patent is:

1. The method of producing a carbonyl compound of the formula

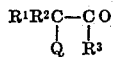

which comprises contacting in the liquid state at a temperature in the range of 0° C. to 150° C. until reaction is complete, an organometallic compound of a metal of the formula QPdX with water and a vinyl alcohol ester of a formula of the group consisting of

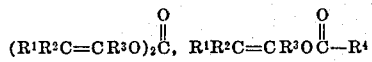

and

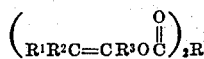

in which $R^1$, $R^2$ and $R^3$ are members of the group consisting of hydrogen and hydrocarbon groups having neither ethylenic nor acetylenic unsaturation and the total carbon of said hydrocarbon groups is less than 15, and the ester group represented by

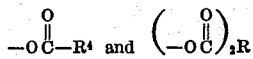

is a carboxylic ester group in which formulas $R^4$ is a monovalent hydrocarbon group having less than 18 carbon atoms and no ethylenic or acetylenic unsaturation, and R is a divalent hydrocarbon radical having 2 to 6 carbon atoms, and no ethylenic or acetylenic unsaturation, and X is an anion of the group consisting of halides, nitrates, chlorates, perchlorates, sulfates, acylates and acetylacetonates, and Q is the organo group of said organometallic compound and is a carbon bonded organo group selected from the group consisting of aryl radicals and hydroxy-, chloro-, methoxy-, nitro-, phenyl-, and diethylamino-substituted aryl radicals where the aryl radical is a member of the group consisting of phenyl, naphthyl, anthracenyl, phenanthryl, fluorenyl, and furyl, thienyl and benzothienyl.

2. The method of producing a carbonyl compound of the formula

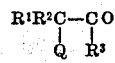

which comprises contacting in the liquid state at a temperature in the range of 0° C. to 150° C. until reaction is complete, an organometallic compound of a metal of the formula QPdX with water and a vinyl alcohol ester of a formula of the group consisting of

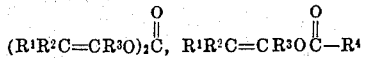

and

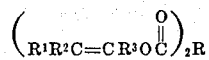

in which $R^3$ is hydrogen and $R^1$ and $R^2$ are members of the group consisting of hydrogen and hydrocarbon groups having neither ethylenic or nor acetylenic unsaturation and the total carbon of said hydrocarbon groups is less than 15, and the ester group represented by

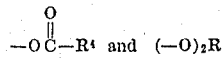

is a carboxylic ester group in which formulas $R^4$ is a monovalent hydrocarbon group having less than 18 carbon atoms and no ethylenic or acetylenic unsaturation, and R is a divalent hydrocarbon radical having 2 to 6 carbon atoms and no ethylenic or acetylenic unsaturation, and X is an anion of the group consisting of halides, nitrates, chlorates, perchlorates, sulfates, acylates and acetylacetonates, and Q is the organo group of said organometallic compound and is a carbon bonded organo group selected from the group consisting of aryl radicals and hydroxy-, chloro-, methoxy, nitro-, phenyl-, and diethylamino-substituted aryl radicals where the aryl radical is a member of the group consisting of phenyl, naphthyl, anthracenyl, phenanthryl, fluorenyl, and furyl, thienyl and benzothienyl.

3. The method of claim 2 in which the organometallic compound of palladium is prepared in situ by contacting and reacting a palladium salt, $PdX_2$, with an organometallic compound of the formula QHgX, $Q_4Sn$, or $Q_4Pb$.

4. The method of claim 2 in which the organometallic compound of palladium is prepared in situ by contacting and reacting a palladium salt, $PdX_2$, with an organomercury compound QHgX.

5. The method of claim 4 in which the organometallic compound is prepared in situ by contacting and reacting a palladium salt, $PdX_2$, and a cupric salt, $CuX_2$, with an organomercury compound QHgX.

6. The method of claim 4 in which the organometallic compound of palladium is prepared in situ by contacting a compound of the formula QH simultaneously with a palladium salt, $PdX_2$, and a mercury compound, $HgX_2$.

7. The method of claim 4 in which $R^1$, $R^2$, and $R^3$ are hydrogen.

8. The method of claim 7 in which aryl is phenyl.

9. The method of claim 4 in which $R^1$ and $R^2$ are hydrogen and $R^3$ is methyl.

10. The method of claim 9 in which aryl is phenyl.

11. The method of claim 4 in which $R^1$ is methyl and $R^2$ and $R^3$ are hydrogen.

References Cited

UNITED STATES PATENTS 3,306,930   2/1967   Copelin et al. _____ 260—604

DANIEL D. HORWITZ, *Primary Examiner.*

UNITED STATES PATENT OFFICE
CERTIFICATE OF CORRECTION

Patent No. 3,413,352                                                November 26, 1968

Richard F. Heck

It is certified that error appears in the above identified patent and that said Letters Patent are hereby corrected as shown below:

Column 2, line 34, "$Q_2Cr$" should read -- $Q_3Cr$ --. Column 4, line 2, after "system" insert -- it --; line 10, "$PdHCl_2$" should read -- $PdHCl$ --. Column 6, line 62, "3.14" should read -- 3.13 --. Column 10, line 11, cancel "or"; lines 15 to 17, the right-hand portion of the formula reading "$(-O)_2R$" should read -- $(-OC\overset{O}{\diagup})_2R$ --.

Signed and sealed this 10th day of March 1970.

(SEAL)
Attest:

Edward M. Fletcher, Jr.                                WILLIAM E. SCHUYLER, JR.
Attesting Officer                                                            Commissioner of Patents